United States Patent
Seuss

(10) Patent No.: US 11,226,946 B2
(45) Date of Patent: Jan. 18, 2022

(54) SYSTEMS AND METHODS FOR AUTOMATICALLY DETERMINING A PERFORMANCE INDEX

(71) Applicant: NORTHERN LIGHT GROUP, LLC, Boston, MA (US)

(72) Inventor: C. David Seuss, Charlestown, MA (US)

(73) Assignee: NORTHERN LIGHT GROUP, LLC, Boston, MA (US)

( * ) Notice: Subject to any disclaimer, the term of this patent is extended or adjusted under 35 U.S.C. 154(b) by 422 days.

(21) Appl. No.: 15/486,589

(22) Filed: Apr. 13, 2017

(65) Prior Publication Data

US 2017/0300538 A1 Oct. 19, 2017

Related U.S. Application Data

(60) Provisional application No. 62/321,873, filed on Apr. 13, 2016.

(51) Int. Cl.
*G06F 7/00* (2006.01)
*G06F 16/22* (2019.01)

(52) U.S. Cl.
CPC ................. *G06F 16/2272* (2019.01)

(58) Field of Classification Search
CPC ........... G06F 16/2272; G06F 17/30321; G06F 17/30616; G06F 17/30619; G06F 17/3087; G06F 17/30946; G06F 2200/00; G06F 2207/491; G06F 16/2425; G06F 16/248; G06F 16/338; G06F 16/638
USPC ................. 707/722, 737, 728, 741
See application file for complete search history.

(56) References Cited

U.S. PATENT DOCUMENTS

| | | |
|---|---|---|
| 4,073,691 A | 2/1978 | Ahnell et al. |
| 5,920,854 A | 7/1999 | Kirsch et al. |
| 5,924,090 A | 7/1999 | Krellenstein |
| 6,038,560 A * | 3/2000 | Wical ............... G06F 16/355 |
| 6,134,553 A | 10/2000 | Jacobson et al. |
| 6,295,529 B1 | 9/2001 | Corston-Oliver et al. |
| 6,349,307 B1 | 2/2002 | Chen |
| 6,549,897 B1 | 4/2003 | Katariya et al. |
| 6,606,620 B1 | 8/2003 | Sundaresan et al. |

(Continued)

FOREIGN PATENT DOCUMENTS

WO 2014183108 A1 11/2014

OTHER PUBLICATIONS

Benjamin, Victor et al., "Evaluating text visualization: An experiment in authorship analysis", 2013 IEEE International Conference on Intelligence and Security Informatics, IEEE, Jun. 4, 2013, pp. 16-20.

(Continued)

*Primary Examiner* — Mohammed R Uddin
(74) *Attorney, Agent, or Firm* — Lando & Anastasi, LLP

(57) ABSTRACT

A computer-implemented method for analyzing electronic documents includes defining at least one search criterion for a plurality of index items relating to a subject; applying the at least one search criterion to a plurality of documents; determining, for each index item in the plurality of index items, a category index reflecting a degree to which the plurality of documents relates to the index item; and generating, with reference to the category index for each index item in the plurality of index items, a performance index reflecting a degree to which the plurality of documents relates to the subject.

20 Claims, 7 Drawing Sheets

(56) References Cited

U.S. PATENT DOCUMENTS

| | | | |
|---|---|---|---|
| 6,789,230 B2 | 9/2004 | Katariya et al. | |
| 6,901,399 B1 | 5/2005 | Corston et al. | |
| 6,901,402 B1 | 5/2005 | Corston-Oliver et al. | |
| 7,117,207 B1 | 10/2006 | Kerschberg et al. | |
| 7,139,752 B2 | 11/2006 | Broder et al. | |
| 7,146,361 B2 | 12/2006 | Broder et al. | |
| 7,188,106 B2 | 3/2007 | Dwork et al. | |
| 7,231,612 B1 | 6/2007 | Mani et al. | |
| 7,269,594 B2 | 9/2007 | Corston-Oliver et al. | |
| 7,286,130 B2 | 10/2007 | Iguchi et al. | |
| 7,827,125 B1* | 11/2010 | Rennison | G06F 16/3335 706/14 |
| 7,877,344 B2 | 1/2011 | Seuss | |
| 7,962,489 B1* | 6/2011 | Chiang | G16B 30/00 707/741 |
| 7,996,210 B2 | 8/2011 | Godbole et al. | |
| 8,117,223 B2* | 2/2012 | Patterson | G06F 16/313 707/759 |
| 8,245,135 B2 | 8/2012 | Cai et al. | |
| 8,271,266 B2 | 9/2012 | Gallagher et al. | |
| 8,276,065 B2 | 9/2012 | Huang et al. | |
| 8,340,957 B2 | 12/2012 | Gallagher et al. | |
| 8,407,215 B2 | 3/2013 | Sheedy et al. | |
| 8,583,580 B2 | 11/2013 | Seuss | |
| 8,838,633 B2* | 9/2014 | Dhillon | G06F 16/36 707/758 |
| 9,015,167 B1* | 4/2015 | Ballou | G06F 16/2228 707/741 |
| 9,323,767 B2* | 4/2016 | Blanchflower | G06F 16/134 |
| 9,397,974 B1 | 7/2016 | Gross et al. | |
| 9,575,961 B2 | 2/2017 | Seuss | |
| 10,380,252 B2 | 8/2019 | Seuss | |
| 2002/0099700 A1* | 7/2002 | Li | G06F 16/951 |
| 2002/0103836 A1 | 8/2002 | Fein et al. | |
| 2002/0169771 A1* | 11/2002 | Melmon | G06F 16/93 |
| 2002/0188587 A1 | 12/2002 | McGreevy | |
| 2003/0078913 A1 | 4/2003 | McGreevy | |
| 2003/0154071 A1 | 8/2003 | Shreve | |
| 2004/0059736 A1 | 3/2004 | Willse et al. | |
| 2004/0107102 A1 | 6/2004 | Chung et al. | |
| 2005/0060288 A1 | 3/2005 | von Groll | |
| 2005/0106126 A1 | 5/2005 | Whitlock | |
| 2005/0144159 A1* | 6/2005 | Baader | G06F 16/3325 |
| 2005/0203970 A1 | 9/2005 | McKeown et al. | |
| 2006/0004732 A1* | 1/2006 | Odom | G06F 16/951 |
| 2006/0010373 A1 | 1/2006 | Burns | |
| 2007/0016563 A1* | 1/2007 | Omoigui | G06F 16/36 |
| 2008/0021925 A1 | 1/2008 | Sweeney | |
| 2008/0071519 A1 | 3/2008 | Brun et al. | |
| 2008/0195597 A1* | 8/2008 | Rosenfeld | G06F 16/40 |
| 2008/0270380 A1 | 10/2008 | Ohrn et al. | |
| 2008/0288442 A1* | 11/2008 | Feigenbaum | G06F 16/313 |
| 2009/0006382 A1 | 1/2009 | Tunkelang et al. | |
| 2009/0099993 A1 | 4/2009 | Seuss | |
| 2009/0157382 A1 | 6/2009 | Bar | |
| 2009/0313236 A1 | 12/2009 | Hernacki et al. | |
| 2010/0079464 A1 | 4/2010 | Matsumura | |
| 2010/0100543 A1* | 4/2010 | Brady | G06F 16/31 707/732 |
| 2010/0166918 A1 | 7/2010 | Miller | |
| 2011/0119271 A1 | 5/2011 | Seuss | |
| 2011/0231416 A1 | 9/2011 | Goodchild Drake | |
| 2011/0252031 A1* | 10/2011 | Blumenthal | G06Q 30/02 707/733 |
| 2011/0289088 A1* | 11/2011 | Yarin | G06F 16/70 707/738 |
| 2012/0095994 A1* | 4/2012 | Nagarajayya | G06F 16/334 707/723 |
| 2012/0215717 A1* | 8/2012 | Arnott | G06Q 40/06 705/36 R |
| 2013/0021346 A1 | 1/2013 | Terman | |
| 2013/0046584 A1* | 2/2013 | Yu | G06F 16/951 705/7.38 |
| 2013/0159340 A1 | 6/2013 | Blanco et al. | |
| 2013/0204876 A1 | 8/2013 | Szucs et al. | |
| 2014/0052672 A1* | 2/2014 | Wagner | G06Q 10/06398 705/500 |
| 2014/0280121 A1 | 9/2014 | Sharp et al. | |
| 2014/0372468 A1* | 12/2014 | Collins | G06F 16/9535 707/769 |
| 2015/0254230 A1 | 9/2015 | Papadopoullos et al. | |
| 2015/0278731 A1* | 10/2015 | Schwaber | G06Q 10/0639 717/102 |
| 2016/0062986 A1 | 3/2016 | Seuss | |
| 2016/0062994 A1 | 3/2016 | Agarwal et al. | |
| 2016/0162582 A1 | 6/2016 | Chatterjee et al. | |
| 2016/0299881 A1 | 10/2016 | Gupta et al. | |
| 2016/0342572 A1 | 11/2016 | Paulin | |
| 2016/0342605 A1 | 11/2016 | Paulin | |
| 2017/0083614 A1 | 3/2017 | Seuss et al. | |
| 2017/0161259 A1 | 6/2017 | Zhao | |
| 2017/0193072 A1* | 7/2017 | Vase | G06N 20/00 |
| 2017/0329841 A1 | 11/2017 | Holmes et al. | |
| 2018/0032608 A1 | 2/2018 | Wu et al. | |
| 2018/0096061 A1 | 4/2018 | Seuss et al. | |
| 2018/0365323 A1 | 12/2018 | Doornenbal et al. | |
| 2019/0129942 A1 | 5/2019 | Seuss | |

OTHER PUBLICATIONS

Hans-Michael Muller et al., "Textpresso: An Ontology-Based Information Retrieval and Extraction System for Biological Literature", PLOS Biology, vol. 2, No. 11, p. 1984-1998, Sep. 21, 2004, XP055335131, DOI: 10.1371/journal.pbio.0020309.

* cited by examiner

|  | Evidence | Evidence | Category Index | Category Index |
|---|---|---|---|---|
| Index Item | BankOne | BankTwo | BankOne | BankTwo |
| Recognized as innovative | 44 | 272 | 16 | 100 |
| Recognizes digital as a trend | 132 | 286 | 46 | 100 |
| Investors can see public vision and strategy statements about digital | 43 | 72 | 60 | 100 |
| Investors can see the company has an in-house trend spotter | 129 | 67 | 100 | 52 |
| Sees digital as a key part of its strategy | 34 | 66 | 52 | 100 |
| Performance Index |  |  | 55 | 93 |

*FIG. 2A*

SYSTEMS AND METHODS FOR AUTOMATICALLY DETERMINING A PERFORMANCE INDEX

CROSS REFERENCE TO RELATED APPLICATIONS

This application claims priority under 35 U.S.C. § 119(e) to U.S. Provisional Application Ser. No. 62/321,873, titled "AUTOMATED INDEX OF COMPANY PERFORMANCE," filed Apr. 13, 2016, which is incorporated herein by reference in its entirety.

BACKGROUND

Technical Field

The technical field of this disclosure relates generally to content analysis and, more specifically, to semantic analysis of documents produced by one or more sources, the semantic analysis used to automatically generate a performance index.

Discussion

Conventional computerized tools for semantic analysis process large bodies of documents to identify topics discussed therein. This processing often includes parsing text stored in the documents and creating a data store that associates documents with their constituent terms and the frequency with which the constituent terms occur within the documents. From this data store, conventional semantic analysis tools rank terms by frequency of occurrence and record terms that occur more frequently than others as being more important. Conventional semantic analysis tools focus on these important terms and their location within documents relative to other terms to discern the topics to which the documents are directed. Examples of processing techniques utilized within conventional semantic analysis tools include latent Dirichlet allocation and probabilistic latent semantic indexing.

Yet currently available tools are unable to draw useful conclusions from the semantic analyses they perform. One field in which such conclusions are useful is the strategic and competitive analysis of companies, whether competitors, acquisition targets, or otherwise. Such analyses may consider a company's characteristics or abilities in one or more categories—for example, is the company innovative? Is it risk-averse? Based on these determined characteristics, a performance index can be determined to reflect how well the company scores, or performs, overall across the categories.

Such analyses are currently performed manually by analysts who research and review publicly-available information about companies of interest, and make determinations based on that information. The analysis is time- and labor-intensive, prone to human error, and—ultimately—highly subjective and greatly affected by the individual analyst's own perceptions and abilities. The resulting report is often expensive and may overlook evidence that is available but not responsive to the analyst's subjective search terms.

SUMMARY

Presently disclosed embodiments address the drawbacks of currently available systems by automating the generation of a performance index that evaluates a subject (e.g., a business entity) across a number of categories in a competitive or business analysis context. Such categories may number in the hundreds or more, and may vary among industries such as financial, banking, medical, legal, technology, entertainment, manufacturing, and so on. For example, the automatically generated performance index may quantify a company's overall performance or potential, or performance or potential in a particular category or for a particular characteristic of interest. Such a performance index may yield competitive insights that would be inaccessible under existing methods, due to the limitations and subjectivity of human-based search and analysis.

An "expert" user (e.g., an industry expert on the industry) may initially define at least one search criterion relating to the entity. The search criterion may be complex, may include nested or hierarchical conditions, and may identify concepts of interest, proximity conditions, complex Boolean expressions, keyword or phrase searching, or the like. Ultimately, the search syntax may relate the entity to a particular conceptual category relevant to the entity's business area, such as its potential or demonstrated innovation, fiscal health, perception or reputation among peer entities, or the like. It will be appreciated that while the example of a business entity is used throughout for purposes of illustration, a performance across multiple categories can be determined for subjects other than business entities, such as individuals, educational and/or non-profit institutions, governmental entities, products, publications, services, and any other subject.

The at least one search criterion can then be applied to a collection of documents that may mention or otherwise relate to the subject, such as news reports, press releases, industry surveys, award announcements, trade publications, regulatory filings, or other documents. In some embodiments, the documents may be retrieved and/or accessible from publicly available sources and/or subscription-based services.

Documents that relate the subject to a particular category may be identified and tabulated to determine a category index for the subject, which may be a number or other grade or score that quantifies the relevance of the documents to that category for the subject. For example, if the subject is a business entity such as a bank, and the category is "has digital banking capabilities," a category index may be determined based on the extent to which the documents reference that bank's digital banking capabilities. The category index may be determined with reference to the number of documents relating the entity to the category; the number of occurrences (or "hits") within the documents relating the subject to the category; or other measure of correlation. Where multiple category indices are calculated (e.g., one category index may relate to innovation, another to fiscal health), an overall performance index for the entity may be determined by aggregating the category index for each category.

In some embodiments, performance indices for multiple subjects (e.g., multiple entities) may be determined for the same, similar, or overlapping categories. An end user (e.g., a researcher) may then be provided the ability to use a graphical user interface to view a numerical and/or visual comparison of the subjects' relative scores in the form of their respective category indices and/or performance indices.

In addition to the category indices and/or performance indices themselves, the underlying results used or referred to in creating the performance index may also be displayed, or made available for display. Search summaries may be presented for one or more documents matching the search syntax may be shown, with each search summary showing metadata about the document (e.g., a title, author, date) as well as selected excerpts of the document containing or relevant to the search syntax.

The graphical user interface may allow users to interact with the performance index and/or the search summaries by "drilling down" to access more detailed data. For example, clicking on the performance index may reveal the category indices used to generate the performance index. As another example, clicking on the performance index and/or an underlying category index may reveal a search summary for a document matching the search index. As yet another example, clicking on a search summary may allow the user to view the full document on which the search summary is based.

According to one aspect, a computer-implemented method for analyzing electronic documents is provided. The method includes defining at least one search criterion for a plurality of index items relating to a subject; applying the at least one search criterion to a plurality of documents; determining, for each index item in the plurality of index items, a category index reflecting a degree to which the plurality of documents relates to the index item; and generating, with reference to the category index for each index item in the plurality of index items, a performance index reflecting a degree to which the plurality of documents relates to the subject.

According to one embodiment, generating the performance index includes aggregating the category index for each index item in the plurality of index items. According to a further embodiment, generating the performance index further includes applying a weighing factor to the category index for at least one index item in the plurality of index items.

According to one embodiment, the plurality of documents includes at least one of news articles and press releases. According to a further embodiment, the subject is a characteristic of an entity, and the performance index represents an evaluation of the entity with respect to the characteristic. According to a still further embodiment, least one search criterion is a search string, and applying the at least one search criterion to the plurality of documents includes determining that at least one of the documents in the plurality of documents satisfies the at least one search criterion by matching the search string in at least one location.

According to another embodiment, the at least one search criterion is a first at least one criterion, the plurality of index items is a first plurality of index items, the subject is a first subject, the category index is a first category index, and the method further includes defining a second at least one search criterion for a second plurality of index items relating to a second subject; applying the second at least one search criterion to the plurality of documents; determining, for each index item in the second plurality of index items, a second category index reflecting a degree to which the plurality of documents relates to the index item in the second plurality of index items; and generating, with reference to the second category index for each index item in the second plurality of index items, a second performance index reflecting a degree to which the plurality of documents relates to the second subject. According to a further embodiment, the method further includes generating a graphical display comprising the first performance index and the second performance index. According to a still further embodiment, the graphical display is one of a bar chart and a radar chart.

According to one embodiment, the category index is at least one of a count of documents satisfying the at least one search criterion, a count of hits within documents satisfying the at least one search criterion, and a depth of coverage of the subject in relation to the index item in the plurality of documents. According to another embodiment, applying the at least one search criterion to the plurality of documents comprises determining that at least one document in the plurality of documents contains a syntactic structure.

According to another embodiment, the at least one search criterion is a search string, and wherein applying the at least one search criterion to the plurality of documents comprises determining that at least one of the documents in the plurality of documents satisfies the at least one search criterion by matching the search string in at least one location. According to a further embodiment, the search string comprises at least one of a keyword search, a phrase search, a proximity search, and a Boolean expression.

According to another embodiment, the method includes generating, for at least one document of the plurality of documents, a search summary of the at least one document; and presenting the search summary via a user interface.

According to another aspect, an index generation system is provided. The system includes an interface configured to receive at least one search criterion for a plurality of index items relating to a subject; a search processor configured to apply the at least one search criterion to a plurality of documents; and an index processor configured to determine, for each index item in the plurality of index items, a category index reflecting a degree to which the plurality of documents relates to the index item, and to generate, with reference to the category index for each index item in the plurality of index items, a performance index reflecting a degree to which the plurality of documents relates to the subject.

According to one embodiment, the system includes a document database configured to store at least one of the plurality of documents and metadata about the plurality of documents. According to a further embodiment, the plurality of documents comprises at least one of news articles and press releases.

According to another embodiment, the index processor is configured to generate a graphical display comprising the first performance index and the second performance index, the system further comprising a user interface configured to display the graphical display.

According to another embodiment, the search criteria is a search string, and wherein the index processor is further configured to apply the at least one search criterion to the plurality of documents by determining that at least one of the documents in the plurality of documents satisfies the at least one search criterion by matching the search string in at least one location. According to a further embodiment, the search string comprises at least one of a keyword search, a phrase search, a proximity search, and a Boolean expression. According to another embodiment, the system includes an expert interface configured to receive the at least one search criterion.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is an example user interface for presenting results to an end user according to one embodiment;

DETAILED DESCRIPTION

Embodiments of the present invention relate to systems and methods for automatically generating, based on search criteria, at least one category index that indicates a degree to which a collection of documents relate a subject to a category. A performance index is automatically generated from the at least one category index, to determine a degree to which the documents relate the subject to the categories. In one example, categories may relate to traits or characteristics of a business entity (e.g., "Company A is considered innovative."). A category may be indicative as to how the entity is perceived by investors in the relevant industry, such as by peers, consumers, or other industry insiders. A category may also be indicative of the company's past statements or actions regarding a particular topic. Categories can be aggregated into the performance index, which may indicate an overall health, ranking, performance level, recommendation, or forecast of or for the entity.

To determine if a collection of content (e.g., documents) relates to the one or more categories, the system may perform automated extraction of meaning from the content. The content may include substantially discrete bodies of content such as documents. These documents, in turn, may be made up of various syntactic structures that embody semantic meaning. Syntactic structures may include any set of symbols from which semantic meaning may be interpreted. A non-limiting list of example syntactic structures includes characters, words, phrases, clauses, sentences, paragraphs and pages. The semantic meaning of one or more syntactic structures may depend not only on the symbols included in the syntactic structure, but also on the context of the syntactic structure, e.g. its relationship to other syntactic structures.

According to one embodiment, search criteria is defined for one or more categories and/or subjects. For example, the search criteria may be used to identify documents showing that a particular subject relates to a particular category (e.g., that the documents indicates that an entity of interest has a particular characteristic). The search criteria are applied to a body of content (e.g., a plurality of documents). A category index is determined for each category, the category index reflecting a degree to which the plurality of documents relates to the category. A performance index is then generated with reference to the category index for each category, the performance index reflecting a degree to which the plurality of documents relates the subject to the category.

Figure 1:
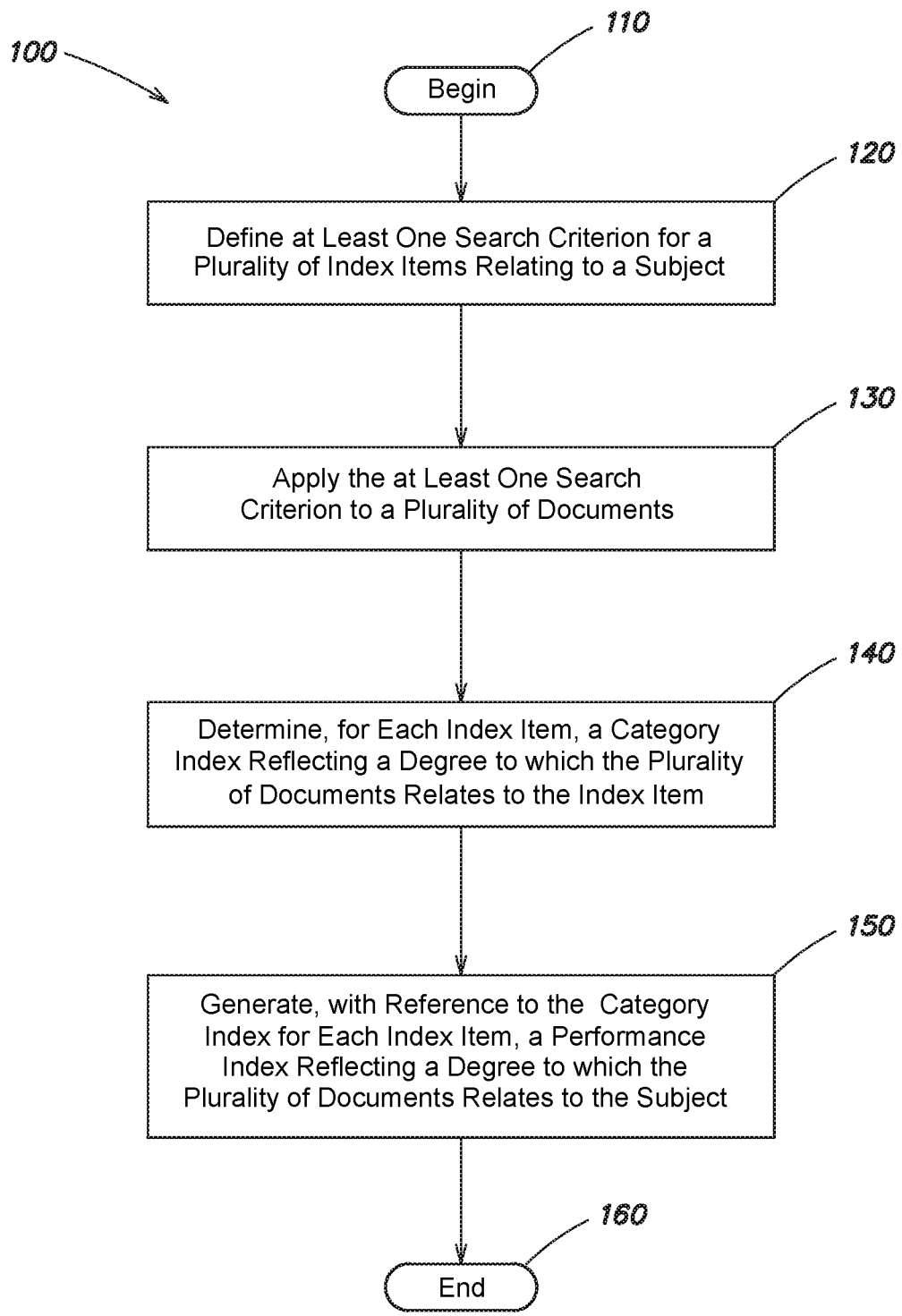
FIG. 1 is a flow chart of a process for generating a performance index according to one embodiment.

An exemplary flow for this method 100 is shown in FIG. 1.

At step 110, method 100 begins.

At step 120, at least one search criterion is defined for at least one index item relating to a subject. The index item (or "category") may be an assertion or a characterization about the entity that can be determined from a collection of documents. For example, the index item may be whether the entity is perceived or recognized by others as having a particular characteristic, or whether the entity has taken actions or made statements relating to the topic, as well as the frequency or degree to which it has done so, as determined from the one or more documents. The index item may be formulated as a question, sentence, or assertion. For example, an index item may relate to the company's recognition as an innovator, and thus be worded as "Recognized as innovative."

The at least one search criterion may be defined by a user, such as an industry expert. The search criteria may include one or more search terms or search strings, which may incorporate substrings or wildcards. Specific documents that contain or match the search string may be identified as being of interest. The search criteria may include one or more queries. These queries may identify specific documents as being of interest if a logical proposition relating to syntactic structures evaluates to true when applied to the specific documents. The logical proposition may be, for example, a logical implication. The logical proposition may include one or more logical operators. A non-limiting list of the logical operators that may be used in these logical propositions includes "and", "or", "xor," or other operators. Comparison operators, such as "<", ">" and "=" may be used. In some embodiments, a proximity operator may be used that will evaluate as true if a search term appears within a configurable proximity from another search term. Still another operator may evaluate as true if a particular search term appears multiple times within a document or a configurable span thereof, such as a sentence, paragraph, section, chapter, or the like.

In some embodiments, the search criteria may include the subject (e.g., entity) along with other search terms. For example, the search criteria may include the proximity term "BankOne near:40 innovat*," meaning that a document satisfies the search criteria if the term "BankOne" appears within 40 words of the word "innovation," "innovative," or other words having a similar root. In other embodiments, the search criteria may instead include a reference or placeholder value for the subject. For example, the search criteria may include the proximity term "{Subject} near:40 innovat*." In such an example, the subject may be defined or otherwise identified separately by the expert and/or end user, such as by entering or selecting an identifier of the subject in an input field or list. Such an approach is advantageous in that the search criteria itself need not be modified if a different subject is desired; the subject may be selected and included in the search criteria at runtime.

The at least one search criterion may also refer to metadata or other information about documents in the plurality of documents. Limitations in the search criteria may be conditioned on information such as the title, author, publication, date, or other information about the document. For example, the at least one search criterion may require that documents are identified as relating to the index item only if they are from a certain date range, certain publications or publication types, or the like.

In some embodiments, the at least one search criterion may be defined as part of one or more meaning taxonomies. The meaning taxonomy may serve as the basis for an analytical framework. Meaning taxonomies are discussed in U.S. Pat. No. 8,583,580, titled "Method and Apparatus for Identifying and Extracting Meaning in Documents," filed on Jan. 24, 2011 and issued on Nov. 12, 2013, which is hereby incorporated by reference in its entirety.

A meaning taxonomy may include key, often complex and/or specialized concepts, or meaning loaded entities, related to the information domain being addressed. The meaning taxonomy may define various non-normalized syntactic structures that when present in a document may indicate the document may be relevant to a meaning loaded entity. Further, the meaning taxonomy may identify various syntactic structures that may be used to normalize the non-normalized syntactic structures. Both the normalized and non-normalized syntactic structures may be associated with meaning loaded entities. A meaning taxonomy may include multiple layers of syntactic structures and associated meaning loaded entities arranged in various ways. For example, in one embodiment, these layers may be hierarchical in nature.

The use of meaning taxonomies and/or meaning loaded entities can be useful in defining search criteria for index items and/or subjects. In one example, a meaning taxonomy may be established in which a meaning loaded entity or normalized syntactic structure of "IBM" is defined for International Business Machines, Inc., of Armonk, N.Y. Non-normalized syntactic structures that identify the company, such as "IBM," "International Business Machines," "Big Blue," and so on may be defined and associated with the meaning loaded entity "IBM." In this manner, an expert or end user interested in determining a performance index for the company could select the meaning loaded entity "IBM" for inclusion in the search criteria. The presence of any of the aforementioned non-normalized syntactic structures in a document would then be identified as containing the subject of the search criteria.

At step 130, the at least one search criterion is applied to a plurality of documents. The system processes the documents to determine and store the syntactic characteristics of each. In one embodiment, the system searches each document to determine if the at least one search criterion is satisfied by the document. The system may produce a comprehensive text analytics database relating the at least one search criterion and/or search terms to one or more documents. In applying the search criteria to the documents, one or more logical propositions may be evaluated with regard to the documents. Based on the results of the logical propositions, the system may then identify a subset of the documents as relating to the index item.

In some embodiments, the at least one search criterion may be applied to the plurality of documents for a range of subjects. For example, if a number of entities in a particular field (e.g., banking) have been identified by an expert or otherwise, the system may apply the search criteria to the plurality of documents for all or some number of the entities. In other words, the search criteria is applied to the documents with respect to all known subjects in the entire industry. While such methods of searching are resource intensive at the outset, requiring a lot of processing time, the tradeoff is that when the search criteria and a particular subject are later selected by a user, the semantic processing and textual analysis has already been performed, meaning that results can be returned almost instantaneously.

At step 140, a category index is determined for each index item in the plurality of index items. The category index reflects a degree to which the plurality of documents relates to the index item. The category index may be a numerical value. In one embodiment, the category index is a count of the number of documents that match the search criterion. Documents may match the search criterion by satisfying a search criteria (i.e., by matching the search criteria, or containing one or more search terms or search strings of interest). In another embodiment, the category index is a count of the number of matches for the search criteria, where a document may contain more than one match.

In another embodiment, matches for the search criteria may be weighed different according to one or more factors. For example, a document that is an article from a general interest publication (e.g., a newspaper) with a widespread (e.g., national or international) distribution may be weighed more heavily in the category index than a regional or trade publication of limited distribution, on the ground that the former may more accurately reflect and/or influence public or industry perceptions. Similarly, a document that treats the subject and/or the index item more extensively may be weighed more heavily in the category index than one that gives a lesser depth of treatment.

As another example, the context of the document may be examined to ascertain its nature, tone, grammar, and other syntactical clues, and the document may be weighted in the category index according to such context. For example, a factual/reporting piece may be weighed more heavily than an opinion piece, and a piece satisfying journalistic standards of style and tone may be weighed more heavily than those discussing the topic in an informal or overly emotional manner. As yet another example, metadata associated with the document may be examined and used to determine weighting of documents. A document whose metadata suggests it is from a peer-reviewed publication may be weighed more heavily than a document whose metadata indicates it is a press release issued by the entity that is the focus of the topic, or that it is was authored by one associated with the entity, on the ground that the latter types of documents may not be as objective.

At step 150, a performance index is generated. The performance index reflects a degree to which the plurality of documents relates to the subject, and is generated with reference to the category index for each index item in the plurality of index items.

In some embodiments, the performance index is an aggregate of all or some subset of the category indices. For example, the performance index may be a sum or average of the category indices. In some embodiments, the category indices used to generate the performance index may be selectable, with an expert user being provided, via a user interface, the option to include or exclude particular category indices. The weight given to each category index in the performance index may also be adjustable.

At step 160, method 100 ends.

The performance index, category indices, and related information for one or more subjects may be displayed to an end user via a graphical user interface. In some embodiments, information about multiple subjects may be displayed in a manner suitable for comparison.

One such graphical user interface 200 can be seen in FIG. 2A. The graphical user interface 200 displays a number of index items 210-250 and related fields for two entities 202a and 202b, the fictional BankOne and BankTwo. In particular, the graphical interface 200 includes an evidence field 212a,b for each of the entities, and a category index field 214a,b for each of the entities. The particular row and column arrangement and index items displayed in interface 200 are for illustration only, and may be configurable by the expert user, a system administrator, or the end user.

It will be appreciated that while only two entities and five index items are shown here for purposes of clarity, the number of entities and/or index items is not so limited. Information for any number of entities may be displayed, with the entities being selectable by an expert user, a system administrator, or the end user. Similarly, any number of index items may be displayed and/or used in determining the performance index, with such index items numbering in the hundreds or higher. In some embodiments where a relatively large number of index items is involved, the index items may be grouped together. The end user may be provided the option to toggle between an unexpanded and expanded view for each group of index items, with aggregate information for a group displayed when the group is in an unexpanded view, and with the individual index items and corresponding information displayed when the group is in an expanded view.

The evidence field 212a,b provides a metric for the documents found to match the category for the relevant target. For example, the evidence field 212a,b may reflect a number of documents that match the index item and/or the number of hits in the documents for the search criteria for the index item. The category index field 214a,b reflects the category index or other score for the index item. For example, the category index field 214a,b may reflect an adjusted or normalized value of the corresponding evidence field 212a,b. In one embodiment, the category index field 214a,b may correspond to a relative amount of evidence for the category as compared to other entities (i.e., subjects). For example, as seen in FIG. 2A, BankOne has a value of 44 for the evidence field 212a for index item 210 ("recognized as innovative") category, whereas BankTwo has a value of 272 for the evidence field 212b for the same index item. In this example, the category index field 214a,b is determined with reference to (e.g., as a percentage of) this high value of 272. Thus, the category index field 214b for BankTwo for index item 210 is is 272/272=100%, whereas the category index field 214a for BankOne for index item 210 is 44/272=16%. In some embodiments, if the evidence field 212a,b reaches a threshold or floor value, the corresponding category index field 214a,b may be set to a maximum value, such as 100%. This would prevent high outlier data in one evidence field 212a,b from skewing the results by causing values for evidence field 212a,b for other subjects to have artificially low values.

The graphical user interface provides a performance index 220a,b respectively for each of the two targets. The performance index 220a,b may be an aggregate or statistic of the corresponding category index fields 214a,b for that subject 202a,b (e.g., entity), such as a sum or average of the category index fields 214a,b in the respective column. In the graphical user interface 200, the performance index 220a for subject 202a is the average of the category index fields 214a.

Figure 2B:
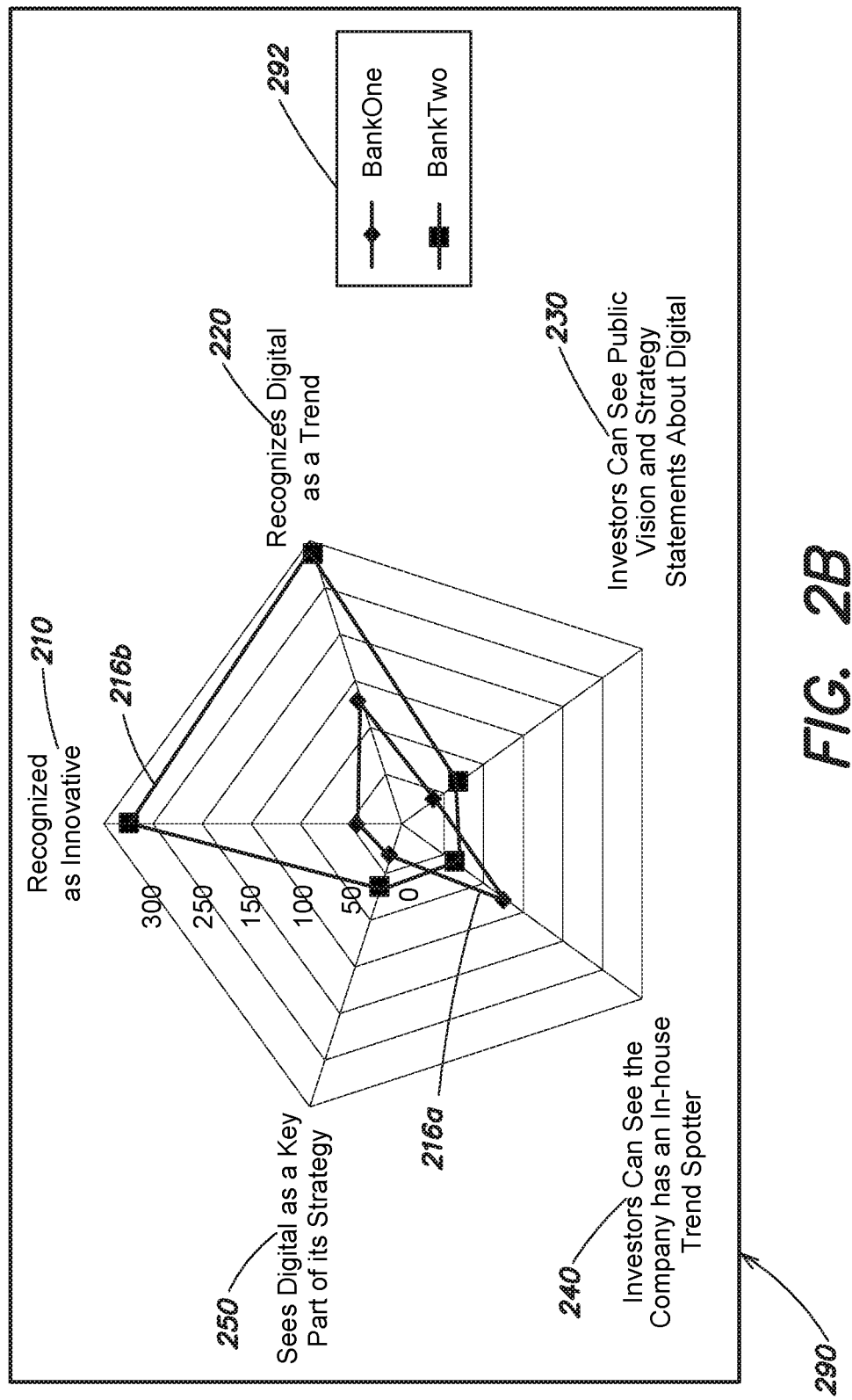
FIG. 2B is another example user interface for presenting results to an end user according to one embodiment.

A graphical user interface may also be provided to show the comparative index values for one or more targets in a graphical or visually descriptive way. For example, as seen in FIG. 2B, a graphical user interface 290 may display the information in a radar chart. The vertices of the chart correspond to the index items 210-250, and each entity's category index fields 214a,b and/or evidence fields 212a,b is presented as series 216a,b, respectively. Each of series 216a,b approaches each vertex to a degree corresponding to the category index field 214a,b or the evidence field 212a,b for that category. A legend 292 may be provided. It will be appreciated that a radar chart format is used here for illustration purposes only, but that any suitable format may be used, including one or more bar charts, line charts, area charts, pie charts, or the like.

The system may allow for drilling down into categories for a more granular review of the underlying data. For example, if the user clicks on one of the index items 210-250 in FIG. 2A or 2B, the user may be presented with a detail user interface for the category.

Figure 3:
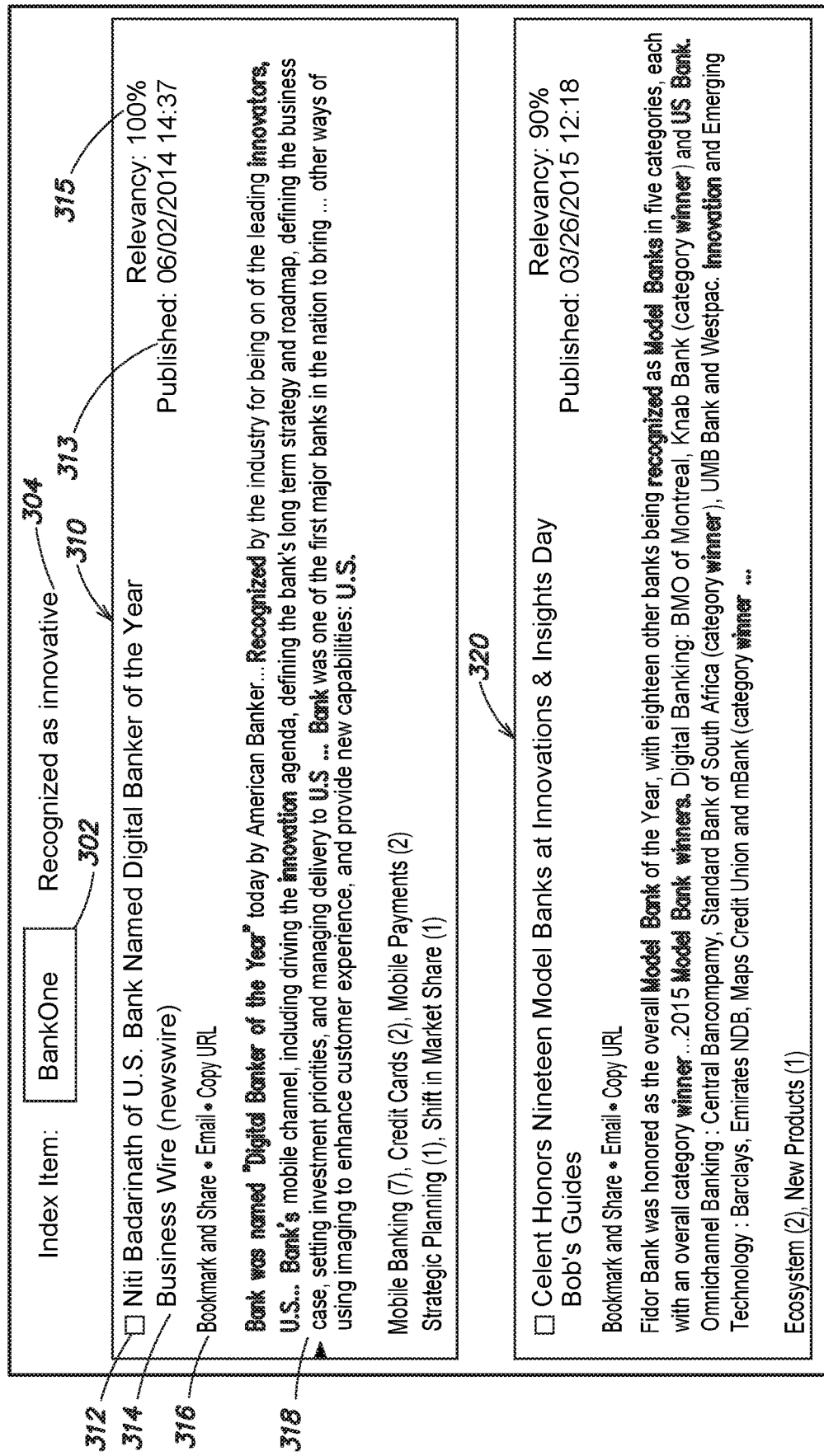
FIG. 3 is another example user interface for presenting results to an end user according to one embodiment.

An exemplary detail user interface 300 can be seen in FIG. 3. The interface 300 displays, for a particular subject 302 and index item 304, one or more search summaries 310, 320 that present an excerpt 318 of information about one or more documents matching the at least one search criterion for the index item 304. Search summaries are discussed in U.S. patent application Ser. No. 14/861,530, titled "System and Method for Concept-Based Search Summaries," filed Sep. 22, 2015, which is hereby incorporated by reference in its entirety. A search summary 310 may display certain metadata about the document to which it relates, including the title 312 (or headline) of the document, the date 313 of the document, a publication or other source 314 from which it was obtained, and a relevancy score 315 assigned to the document by the system. The relevancy score 315 may reflect or relate to the number of occurrences or matches of the at least one search criterion in the document, the depth of treatment of the target by the document, or other metric.

Action icons 316 may also be provided allowing the user to take one or more actions with respect to the search summary 310. For example, the user may be given the option to bookmark the search summary 310 and/or underlying document for later review; to email or otherwise share the search summary 310 and/or the underlying document; or to copy the search summary 310 and/or underlying document for use in another application or context.

The interface 300 may provide the user with the option, through a hyperlink or other interactive element, to view the underlying document on which the search summary 310 is based. For example, clicking on the title 312 may cause the entire document to be displayed.

In some embodiments, a field (not shown) in the interface 300 may display the at least one search criterion.

In addition to displaying the interfaces 200, 290, and 300 via a graphical user interface of a computer, the interfaces and/or the underlying data may be provided to other applications or systems through a system or network interface.

The methods and interfaces described herein can be implemented on a specially programmed computer system.

Figure 4:
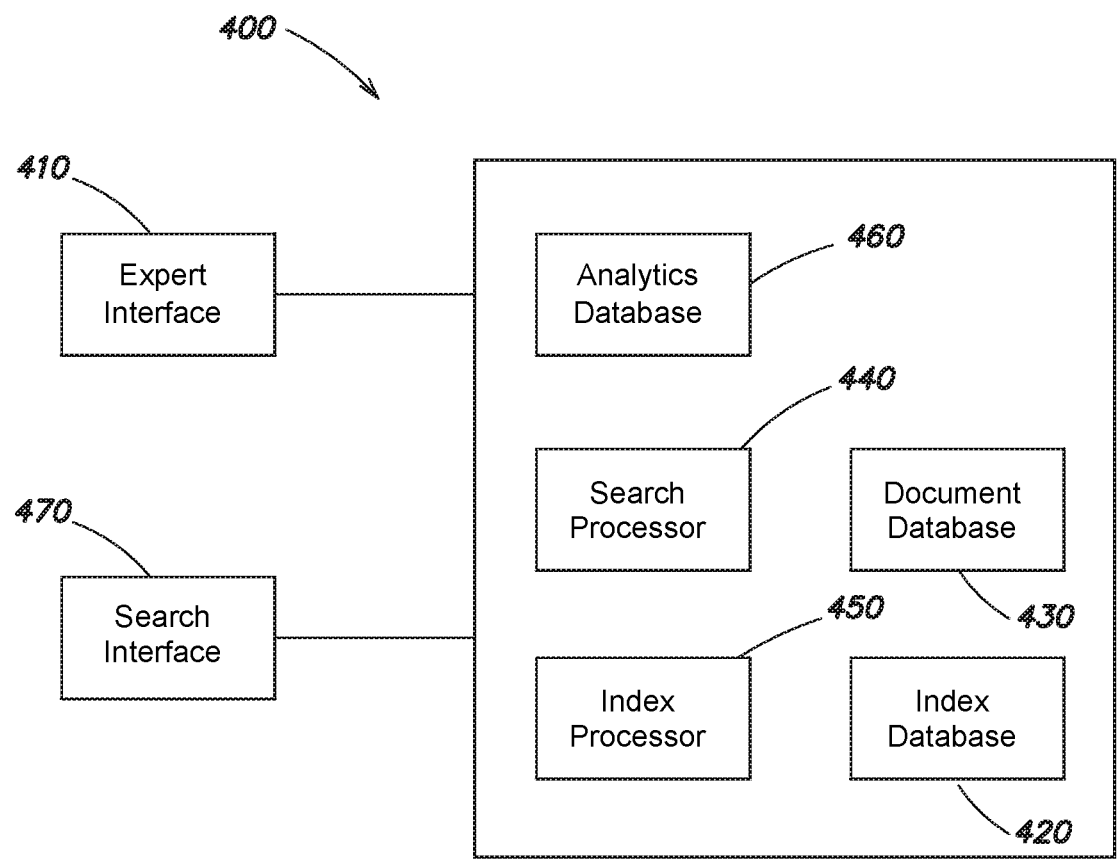
FIG. 4 is a block diagram of a system for generating a performance index according to one embodiment.

FIG. 4 illustrates a functional block diagram of a performance index system 400 according to one embodiment of the invention.

The system 400 includes an expert interface 410 configured to receive, from an expert or other administrator of the system, the index items and associated at least one search criterion. The at least one search criterion is stored in an index database 420, and is applied by an index processor 450 to some or all of the documents in the document database 430 to identify documents of interest (e.g., documents satisfying the search criteria) and associate them with the index items to create a category index for each category. The index processor 450 then aggregates the category indices into a performance index, as described herein. The index items, category indices, document data and metadata, and performance index may be stored in an analytics database 460.

An end user may be provided with a search interface 470 (e.g., interfaces 200, 290, and/or 300), which can trigger the search processor 440 to retrieve information requested by the user from the document database 430, the analytics database 460, and/or the index database 420.

The expert interface 410 may provide to the expert an input element by which to type or upload the at least one search criterion. For example, the expert may be provided the opportunity to input or select information through one or more input devices, including a keyboard, or a mouse or trackball device allowing the expert to click or drag-and-drop elements to create the at least one search criterion. In some embodiments, the expert may be provided the ability to define a meaning taxonomy including one or more meaning loaded entities, normalized syntactical structures, and/or non-normalized syntactical structures.

Figure 5:
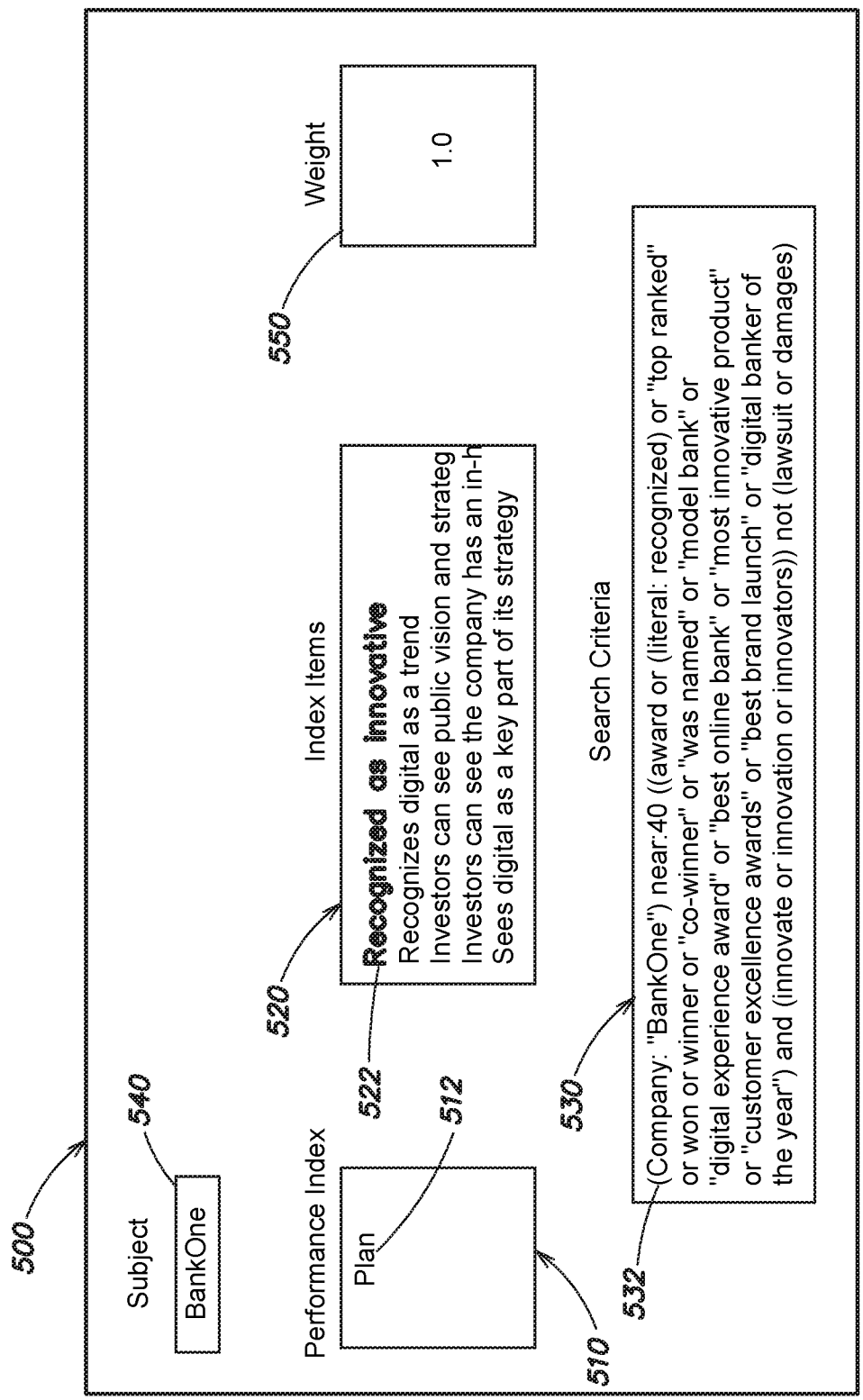
FIG. 5 is an example user interface for presenting results to an end user according to one embodiment.

An exemplary expert interface 500 can be seen in FIG. 5. The interface 500 includes a performance index field 510 and a category index field 520 that allows the expert to associate one or more category indices with the performance index. While only one performance index 512 is shown in FIG. 5, any number of performance indices may be stored and created by one or more expert users. Different performance indices may relate to the different category indices, and may be specific to a particular subject/entity, industry, or the like.

The interface 500 further includes one or more subject fields 540 that allow the user to identify one or more subjects for the performance index, such as an entity of interest. The subject field 540 may be a prepopulated pulldown menu, or may allow the expert to type or otherwise input an identifier of the targets.

The performance index field 510 may allow the expert to select one or more performance indices (e.g., performance index 512), causing the category index field 520 to be populated by the index items currently associated with the currently selected performance index. Similarly, the category index field 520 may allow the expert to select one or more index items (e.g., index item 522), causing a search criteria field 530 to be populated by search criteria (e.g., search string 532) currently used as the search criteria associated with the category.

As can be seen, the search criteria may be complex, may include nested or hierarchical conditions, and may identify keywords or meaning loaded entities of interest, proximity conditions, complex Boolean expressions, keyword or phrase searching, or the like. In the example shown in FIG. 5, the search criteria 532 in the search criteria field 530 includes a requirement that the subject identifier (i.e., "BankOne") be within a proximity of other terms of interest relating to the index item in question.

The search criteria 532 may also identify conditions that would exclude documents from being included in the category index. Such exclusionary terms may be useful when other search terms may tend to include irrelevant information. For example, search criteria may specify that "GM" may be relevant to "General Motors," whereas "gm" is not. In some embodiments, the search criteria may specify that a term present anywhere in a document be used to disambiguate the context of the term. For example, the term "car" or "truck" appearing anywhere in a document may indicate that the document is about the automotive industry. Such disambiguation may also be performed with exclusionary terms. For example, the term "genetically modified" appearing anywhere in the document may indicate that the document does not relate to General Motors or the automotive industry even though "GM" appears in the document.

In some embodiments, a weight field 550 may be provided, allowing the user to assign a relative weight to a currently selected category index field 520. The weight field 550 may allow the user to express the relative weight as a percentage or on a relative scale (e.g., assigning a weight from among a set of numbers), and may be a text input field, slider, pull down menu, or other input element.

Returning to FIG. 4, the index database 420, the document database 430, and the analytics database 460 may take the form of any logical construction capable of storing information on a computer readable medium including flat files, indexed files, hierarchical databases, relational databases and/or object oriented databases. The data may be modeled using unique and foreign key relationships and indexes. The unique and foreign key relationships and indexes may be established between the various fields and tables to ensure both data integrity and retrieval speed.

The expert interface 410 and/or the search interface 470 may be provided through a web portal, or through a downloadable app on a computer or mobile device.

Information may flow between the components of system 400 using any technique known in the art. Such techniques include passing the information over the network via TCP/IP, passing the information between modules in memory and passing the information by writing to a file, database, or some other non-volatile storage device.

Exemplary Computer System

Figure 6:
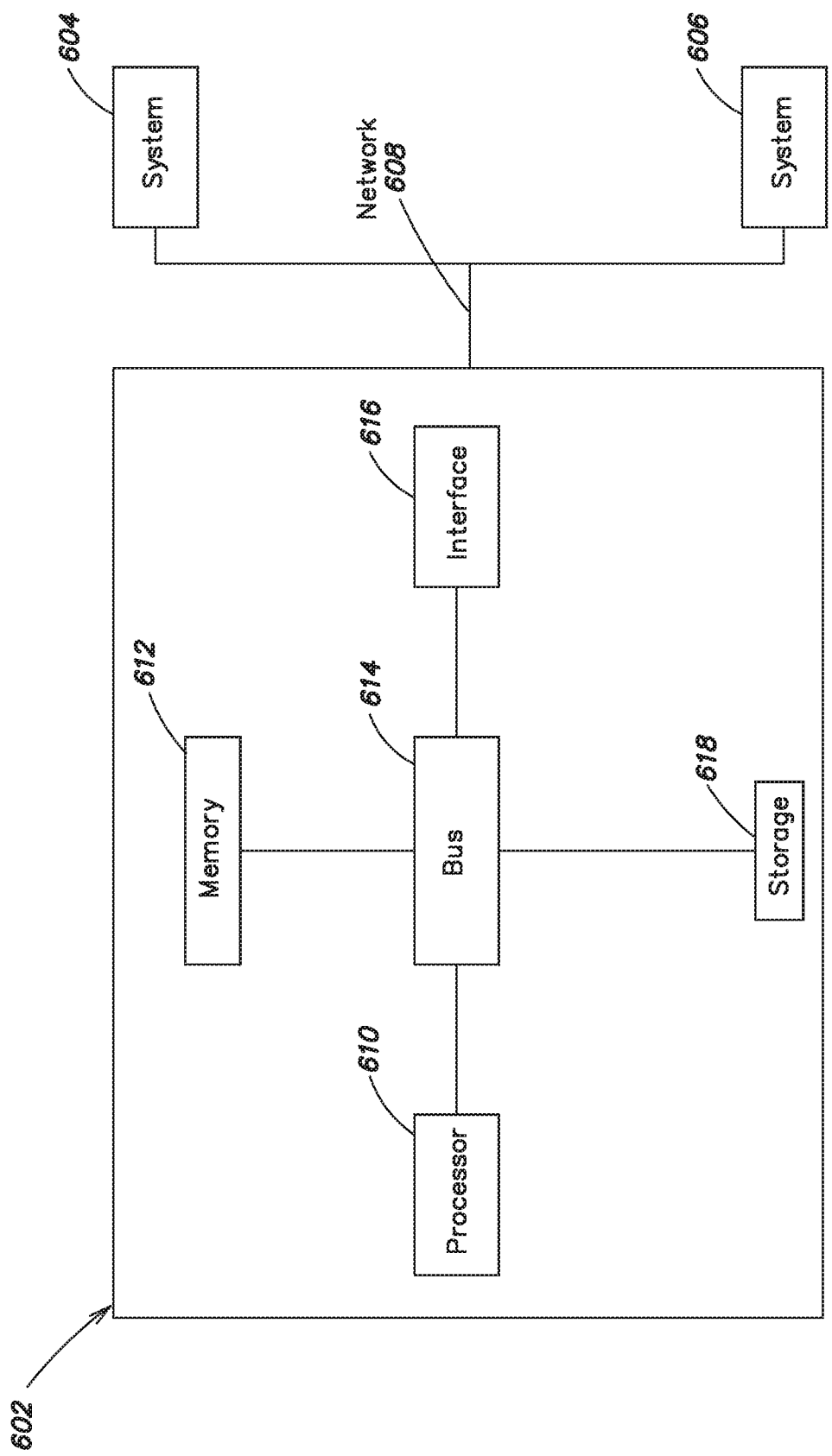
FIG. 6 is a block diagram of one example of a computer system on which aspects and embodiments of this disclosure may be implemented.

FIG. 6 is a block diagram of a distributed computer system 600, in which various aspects and functions discussed above may be practiced. The distributed computer system 600 may include one or more computer systems. For example, as illustrated, the distributed computer system 600 includes three computer systems 602, 604 and 606. As shown, the computer systems 602, 604 and 606 are interconnected by, and may exchange data through, a communication network 608. The network 608 may include any communication network through which computer systems may exchange data. To exchange data via the network 608, the computer systems 602, 604, and 606 and the network 608 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for producing a three-dimensional synthetic viewpoint can be executed on computer systems 602, 604 and 606 individually and/or in combination. For example, the computer systems 602, 604, and 606 support, for example, participation in a collaborative network. In one alternative, a single computer system (e.g., 602) can generate the three-dimensional synthetic viewpoint. The computer systems 602, 604 and 606 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system shown in FIG. 6. In one embodiment, computer system 602 is a personal computing device specially configured to execute the processes and/or operations discussed above. As depicted, the computer system 602 includes at least one processor 610 (e.g., a single core or a multi-core processor), a memory 612, a bus 614, input/output interfaces (e.g., 616) and storage 618. The processor 610, which may include one or more microprocessors or other types of controllers, can perform a series of instructions that manipulate data. As shown, the processor 610 is connected to other system components, including a memory 612, by an interconnection element (e.g., the bus 614).

The memory 612 and/or storage 618 may be used for storing programs and data during operation of the computer system 602. For example, the memory 612 may be a relatively high performance, volatile, random access memory such as a dynamic random access memory (DRAM) or static memory (SRAM). In addition, the memory 612 may include any device for storing data, such as a disk drive or other non-volatile storage device, such as flash memory, solid state, or phase-change memory (PCM). In further embodiments, the functions and operations discussed with respect to generating and/or rendering synthetic three-dimensional views can be embodied in an application that is executed on the computer system 602 from the memory 612 and/or the storage 618. For example, the application can be made available through an "app store" for download and/or purchase. Once installed or made available for execution, computer system 602 can be specially configured to execute the functions associated with producing synthetic three-dimensional views.

Computer system 602 also includes one or more interfaces 616 such as input devices (e.g., camera for capturing images), output devices and combination input/output devices. The interfaces 616 may receive input, provide output, or both. The storage 618 may include a computer-readable and computer-writeable nonvolatile storage medium in which instructions are stored that define a program to be executed by the processor. The storage system 618 also may include information that is recorded, on or in, the medium, and this information may be processed by the application. A medium that can be used with various embodiments may include, for example, optical disk, magnetic disk or flash memory, SSD, among others. Further, aspects and embodiments are not to a particular memory system or storage system.

In some embodiments, the computer system 602 may include an operating system that manages at least a portion of the hardware components (e.g., input/output devices, touch screens, cameras, etc.) included in computer system 602. One or more processors or controllers, such as processor 610, may execute an operating system which may be, among others, a Windows-based operating system (e.g., Windows NT, ME, XP, Vista, 7, 8, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Oracle Corporation, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for generating and manipulating images may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 602 is shown by way of example as one type of computer system upon which various functions for producing three-dimensional synthetic views may be practiced, aspects and embodiments are not limited to being implemented on the computer system shown in FIG. 6. Various aspects and functions may be practiced on one or more computers or similar devices having different architectures or components than that shown in FIG. 6.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer-implemented method comprising:
defining a first search criterion for locating references to a first entity of a plurality of entities referenced in a plurality of publicly-available news sources in connection with a first performance category in a plurality of performance categories, the plurality of publicly-available news sources comprising one or more of news reports, press releases, industry surveys, award announcements, trade publications, or regulatory filings;
defining a second search criterion, different from the first search criterion, for locating references to the first entity in the plurality of publicly-available news sources in connection with a second performance category in the plurality of performance categories;
applying the first search criterion to the plurality of publicly-available news sources, to obtain a first search result based on one or more matches of the first search criterion in a first subset of the plurality of publicly available news sources;
applying the second search criterion to the plurality of publicly-available news sources, to obtain a second search result based on one or more matches of the second search criterion in a second subset of the plurality of publicly available news sources;

determining, as a function of at least the first search result, a first category metric reflecting performance of the first entity in the first performance category as indicated by the plurality of publicly-available news sources;

determining, as a function of at least the second search result, a second category metric reflecting performance of the first entity in the second performance category as indicated by the plurality of publicly-available news sources; and generating, as a function of at least the first category metric and the second category metric, a first performance index reflecting overall performance of the first entity across the plurality of performance categories as indicated by the plurality of publicly-available news sources.

2. The method of claim 1, wherein generating the first performance index comprises aggregating the first category metric and the second category metric.

3. The method of claim 2, wherein generating the first performance index further comprises applying a weighing factor to one or more of the first category metric and the second category metric.

4. The method of claim 1, wherein the first performance index represents an evaluation of the first entity with respect to a characteristic of the first entity.

5. The method of claim 1, further comprising:
defining a third search criterion for locating references to a second entity of the plurality of entities referenced in the plurality of publicly-available news sources in connection with the first performance category;
defining a fourth search criterion, different from the third search criterion, for locating references to the second entity in the plurality of publicly-available news sources in connection with the second performance category;
applying the third search criterion to the plurality of publicly-available news sources, to obtain a third search result based on one or more matches of the third search criterion in a third subset of the plurality of publicly available news sources;
applying the fourth search criterion to the plurality of publicly-available news sources, to obtain a fourth search result based on one or more matches of the fourth search criterion in a fourth subset of the plurality of publicly-available news sources;
determining, as a function of at least the third search result, a third category metric reflecting performance of the second entity in the first performance category as indicated by the plurality of publicly-available news sources;
determining, as a function of at least the fourth search result, a fourth category metric reflecting performance of the second entity in the second performance category as indicated by the plurality of publicly-available news sources; and
generating, as a function of at least the third category metric and the fourth category metric, a second performance index reflecting overall performance of the second entity across the plurality of performance categories as indicated by the plurality of publicly-available news sources.

6. The method of claim 5, further comprising generating a graphical display comprising the first performance index and the second performance index.

7. The method of claim 6, wherein the graphical display is one of a bar chart and a radar chart.

8. The method of claim 1, wherein the first category metric comprises at least one of a count of documents in the plurality of publicly-available news sources satisfying the first search criterion, a count of hits within documents in the plurality of publicly-available news sources satisfying the first search criterion, and a depth of coverage of the first subject in relation to the first performance category in the plurality of publicly-available news sources.

9. The method of claim 1, wherein applying the first search criterion to the plurality of publicly-available news sources comprises determining that at least one document in the plurality of publicly-available news sources contains a syntactic structure.

10. The method of claim 1, wherein the first search criterion comprises a search string, and wherein applying the first search criterion to the plurality of publicly-available news sources comprises determining that at least one document in the plurality of publicly-available news sources satisfies the first search criterion by matching the search string in at least one location.

11. The method of claim 10, wherein the search string comprises at least one of a keyword search, a phrase search, a proximity search, and a Boolean expression.

12. The method of claim 1, further comprising:
generating, for at least one document of the plurality of publicly-available news sources, a search summary of the at least one document; and
presenting the search summary via a user interface.

13. The method of claim 1, wherein the first search criterion comprises at least one term disambiguating the first performance category from a separate concept having similar terminology.

14. The method of claim 1, wherein at least one news source in the plurality of publicly-available news sources is in both the first subset and the second subset of the plurality of publicly-available news sources.

15. An index generation system comprising:
at least one device including one or more hardware processors; and
one or more computer-readable media storing instructions that, when executed by the one or more processors, cause performance of operations comprising:
defining a first search criterion for locating references to a first entity of a plurality of entities referenced in a plurality of publicly-available news sources in connection with a first performance category in a plurality of performance categories, the plurality of publicly-available news sources comprising one or more of news reports, press releases, industry surveys, award announcements, trade publications, or regulatory filings;
defining a second search criterion, different from the first search criterion, for locating references to the first entity in the plurality of publicly-available news sources in connection with a second performance category in the plurality of performance categories;
applying the first search criterion to the plurality of publicly-available news sources, to obtain a first search result based on one or more matches of the first search criterion in a first subset of the plurality of publicly available news sources;
applying the second search criterion to the plurality of publicly-available news sources, to obtain a second search result based on one or more matches of the second search criterion in a second subset of the plurality of publicly available news sources;

determining, as a function of at least the first search result, a first category metric reflecting performance of the first entity in the first performance category as indicated by the plurality of publicly-available news sources;

determining, as a function of at least the second search result, a second category metric reflecting performance of the first entity in the second performance category as indicated by the plurality of publicly-available news sources; and generating, as a function of at least the first category metric and the second category metric, a first performance index reflecting overall performance of the first entity across the plurality of performance categories as indicated by the plurality of publicly-available news sources.

16. The system of claim 15, further comprising a document database configured to store a plurality of documents from the plurality of publicly-available news sources and metadata about the plurality of documents.

17. The system of claim 15, the operations further comprising:

generating a graphical display comprising at least one of (a) the first performance index and (b) a second performance index reflecting overall performance of the second entity across the plurality of performance categories as indicated by the plurality of publicly-available news sources, the system further comprising a user interface configured to display the graphical display.

18. The system of claim 15, wherein the first search criterion comprises a search string, and wherein applying the first search criterion to the plurality of publicly-available news sources comprises determining that at least one document in the plurality of publicly-available news sources satisfies the first search criterion by matching the search string in at least one location.

19. The system of claim 18, wherein the search string comprises at least one of a keyword search, a phrase search, a proximity search, and a Boolean expression.

20. The system of claim 15, further comprising a graphical user interface configured to receive at least one of the first search criterion and the second search criterion.

* * * * *